United States Patent [19]
Henlis

[11] 4,106,454
[45] Aug. 15, 1978

[54] APPARATUS FOR INCREASING THE EFFICIENCY OF INTERNAL COMBUSTION ENGINES

[75] Inventor: Lawrence Philip Henlis, Hawley, Pa.

[73] Assignees: Harvey Jasper, Woodmere; Ezekiel Jasper; Harry Ball, both of Brooklyn, all of N.Y. ; part interest to each

[21] Appl. No.: 738,998

[22] Filed: Nov. 5, 1976

[51] Int. Cl.² .............................................. F02M 31/00
[52] U.S. Cl. .............................. 123/122 F; 123/122 H; 261/142; 219/206; 219/207
[58] Field of Search ............... 123/122 F, 122 H, 133, 123/141; 261/142; 219/206, 207

[56] References Cited
U.S. PATENT DOCUMENTS

| | | | |
|---|---|---|---|
| 2,414,296 | 1/1947 | Gill | 123/122 H |
| 3,625,190 | 12/1971 | Boissevain | 123/122 F |
| 3,850,152 | 11/1974 | Hollins | 123/122 H |
| 4,020,812 | 5/1977 | Hayward | 123/122 F |

*Primary Examiner*—Ronald H. Lazarus
*Attorney, Agent, or Firm*—C. Bruce Hamburg

[57] ABSTRACT

Apparatus for increasing the efficiency of combustion in an internal combustion engine having a fuel atomizing means, an intake to the combustion chambers and a battery powered electrical ignition system comprises at least one screen inserted between the fuel atomizing means and the intake for contacting fuel which has been atomized by the fuel atomizing means, electrical means powered by the battery for heating the screen sufficiently to vaporize atomized fuel in contact therewith and means for adjusting the power supplied to the heating means by the battery in response to the operating conditions of the engine.

4 Claims, 2 Drawing Figures

APPARATUS FOR INCREASING THE EFFICIENCY OF INTERNAL COMBUSTION ENGINES

BACKGROUND OF THE INVENTION

This invention relates to apparatus for increasing the efficiency of internal combustion engines. More particularly, this invention relates to means for increasing the efficiency of the combustion in the engines thereby to result in greater gas mileage or greater horsepower or both as well as a decrease in the quantities of noxious substances, such as carbon monoxide and hydrocarbons, in the exhaust gases.

The high price of gasoline, projected future shortages in world supplies of petroleum and concern for improving the environment have made the development of internal combustion engines in which combustion occurs with greater efficiency of paramount concern. It has occurred to some persons that heating the gasoline between the carburetor and the intake manifold, thereby to assure that the gasoline entering the intake manifold is completely vaporized rather than merely partly vaporized and partly atomized, would result in more complete combustion in the cylinders and, consequently, greater gas mileage or greater horsepower or both as well as a decrease in the quantities of noxious substances, such as carbon monoxide and hydrocarbons, in the exhaust gases. Prior art proposals, however, have not been practical. For example, it has been proposed to insert a screen between the carburetor and the intake manifold and employ the screen as a resistance heater by passing direct current through it from the battery. The operation of vehicles powered by internal combustion engines equipped with such a system proved impractical. At low engine speeds or low loading, such as encountered when idling or driving at low speeds, the heated screen would become dangerously hot because insufficient atomized fuel would be coming into contact therewith per unit time to take up the heat by vaporization. At high engine speeds or high loading, the screen would not stay sufficiently hot to efficiently vaporize the atomized fuel, because the quantities of atomized fuel coming into contact therewith per unit time would be greater than could be vaporized by the heat output of the screen.

It is an object of the invention to provide apparatus for increasing the efficiency of the combustion in internal combustion engines while avoiding the disadvantages of prior art systems intended for this purpose.

Other objects and advantages of the invention will be apparent from the following description of the invention.

SUMMARY OF THE INVENTION

According to the invention, there is provided apparatus for increasing the efficiency of combustion in an internal combustion engine having fuel atomizing means, typically at least one carburetor or fuel injectors, an intake to the combustion chambers, such as an intake manifold communicating between the carburetor and the cylinders and a battery powered electrical ignition system. The apparatus comprises at least one screen, preferably two consecutive closely spaced screens, inserted between the fuel atomizing means and the intake for contacting fuel which has been atomized by the fuel atomizing means, electrical means powered by the battery for heating the at least one screen sufficiently to vaporize atomized fuel coming in contact therewith and means for adjusting the power supplied to the heating means by the battery and, hence, the thereto proportional heat output of the heating means in response to the operating conditions of the engine, namely, speed, load and nature and quality of the fuel supplied to the engine.

The aforementioned adjusting means assures that the screen or screens will be neither underheated nor overheated regardless of the operating conditions. As the engine speed and/or load increases, whereby the mass flow rate of atomized fuel onto the screen or screens increases, the adjusting means provides a greater supply of power to the heating means and, consequently, a greater heat output of the screen or screens thereby to provide sufficient heat to vaporize the atomized fuel coming in contact with the screen or screens. Conversely, as the engine speed or load decreases, the adjusting means provides a lesser supply of power to the heating means. Similarly, when the nature or quality of fuel supplied to the engine is changed such that the fuel has a greater or lesser specific heat and/or heat of vaporization, the adjusting means provides a correspondingly greater or lesser supply of power to the heating means. Combinations of these changes in operating conditions will also be compensated for by the adjusting means.

The invention can make use of the fact that any conventional ignition distributor includes an automatic timing control device which determines the optimum ignition timing suited to the aforementioned operating conditions of the engine. More particularly, the adjusting means may comprise means for comparing the voltage of electrical pulses from the distributor with the voltage of the battery and means for conducting the pulses to the heating means when the voltage thereof exceeds the voltage of the battery thereby to power the heating means, the output of the heating means being proportional to the power supplied thereto.

DESCRIPTION OF A PREFERRED EMBODIMENT

Figure 1:
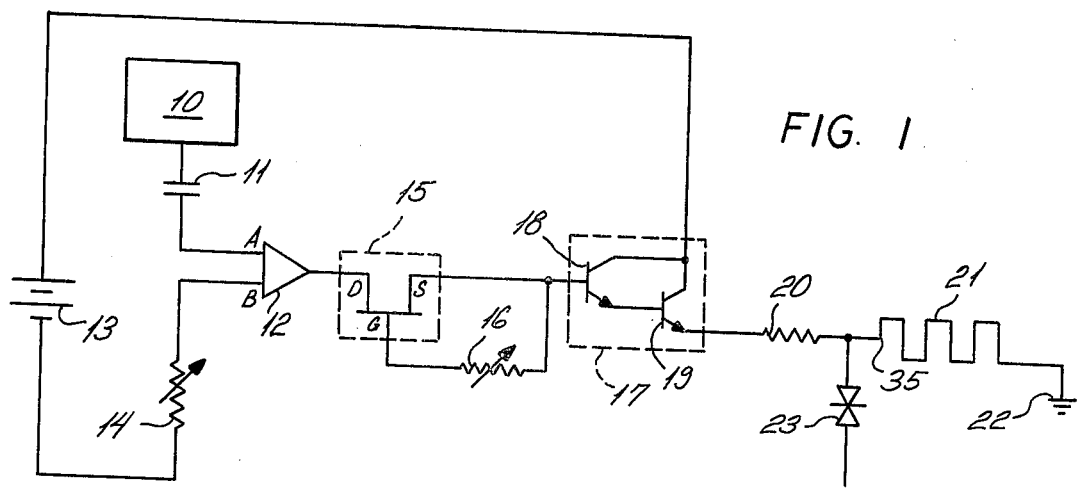
FIG. 1 is a schematic diagram of a circuit embodying the aforementioned adjusting means of apparatus according to the invention.

With reference to FIG. 1, it is seen that the distributor 10 is connected across a capacitor 11 to a voltage comparator 12 at A, and the motor vehicle's battery 13 is connected across a variable resistance 14 to the voltage comparator 12 at B. The output of the voltage comparator 12 is connected to a field effect transistor 15 having a drain D, source S and gate G, which is in parallel with a variable resistance 16. This arrangement is connected to a Darlington amplifier 17 which includes two switching transistors 18 and 19 and to which the positive pole of the battery 13 is connected. The amplifier 17 is connected through a fixed resistance 20 to a resistance heater 21 which is grounded at 22. As a safety feature, a Zener diode 23 may be interposed between the resistance 20 and the heater 21. The variable resistances 14 and 16 are not variable controls but are adjusted simply as manufacturing and servicing measures to optimize performance of the system. The Zener diode 23 protects the heater 21 from overload. It is apparent that the system is operative to power the heater 21 with electrical pulses from the distributor 10, a pulse from the distributor 10 and capacitor 11 passing through the voltage comparator 12 when the voltage at A exceeds the voltage at B.

Figure 2:
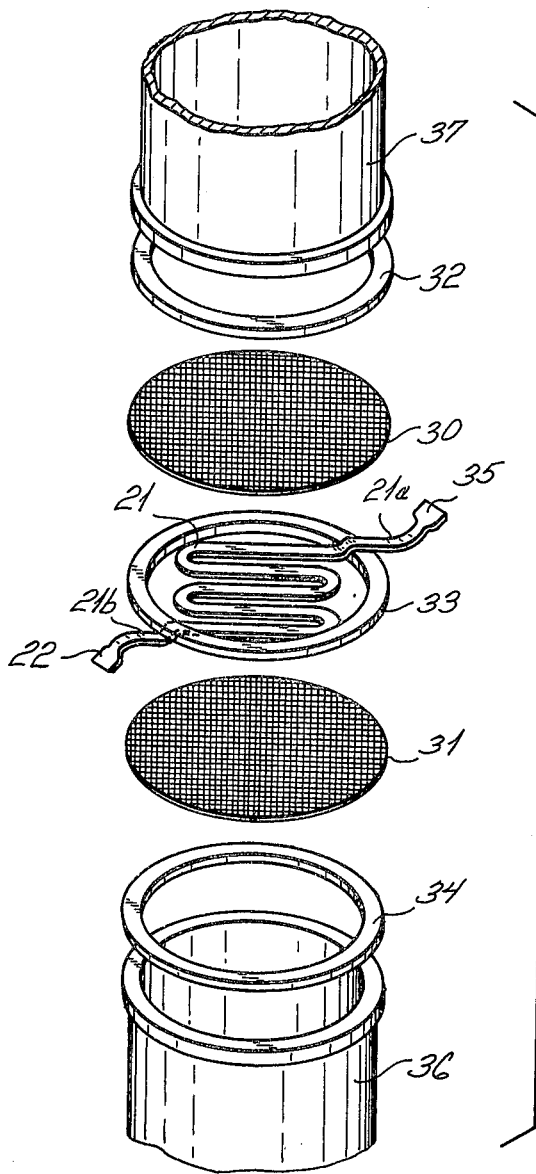
FIG. 2 is an exploded isometric view of the installed heating means of apparatus according to the invention.

With reference to FIG. 2, it is seen how the heater 21, the power to which is controlled by the system of FIG. 1, may be installed. For the sake of simplicity of illustration, FIG. 2 is somewhat schematic, such obvious details as bolts or other means holding the assembly together having been omitted. An assembly of the heater 21, which may be a conventional convoluted strip of nichrome wire provided with tabs at its ends for ease of electrical connection, two metallic screens 30 and 31 and three gaskets 32, 33 and 34 is sandwiched between the base plate of a carburetor 37 and the intake manifold 36 of an internal combustion engine. The gaskets 32, 33 and 34 provide vapor-tight sealing and the gasket 33 also serves to provide a small space between the screens 30 and 31 to accommodate the heater 21 out of contact with the screens 30 and 31. As illustrated, the input end 21a of the heater 21 is passing on the top of the gasket 33 while the grounded end 21b of the heater 21 is passing on the bottom of the gasket 33, the portion of the heater 21 therebetween lying in the central opening of the gasket 33 in a plane between the top and bottom surfaces of the gasket 33. In actual practice, to prevent the input end 21a of the heater 21 from contacting the screen 30 and the grounded end 21b from contacting the screen 31, the end portions 21a and 21b contiguous with the screens 30 and 31, respectively, will, for example, be covered with electrical insulation and/or received in recesses cut into the top and bottom faces of the gasket 33. The tab 35 at the input end 21a of the heater 21 is electrically connected to the circuit of FIG. 1 and the tab 22 is fastened to the intake manifold 36 in electrical contact therewith to ground the heating system.

The screens 30 and 31 are heated radiantly by the heater 21. In a typical embodiment, the screens 30 and 31 are heated to temperatures of about 200° ±25° F. and have been spaced from each other by about 2–4 mm. One type of screen which has been used is common aluminum or galvanized screen made of 0.0025 inch wire and having 15 openings per inch. It is estimated that about 30% of the atomized fuel is vaporized on the first screen 30 and the rest on the second screen 31. More efficient combustion resulted, with consequent greater gas mileage and horsepower and lower pollutant emissions.

While the invention has been described with reference to a specific embodiment thereof, it is to be understood that such description is intended to illustrate rather than limit the invention defined by the hereto appended claims.

What I claim is:

1. Apparatus for increasing the efficiency of combustion in an internal combustion engine having fuel atomizing means, an intake to the combustion chambers and a battery powered electrical ignition system including a distributor, comprising at least one screen inserted between the fuel atomizing means and the intake for contacting fuel which has been atomized by the fuel atomizing means, electrical means powered by the battery for heating the at least one screen sufficiently to vaporize atomized fuel coming in contact therewith and means for adjusting the power supplied to the heating means by the battery in response to the operating conditions of the engine, the adjusting means comprising means for comparing the voltage of electrical pulses from the distributor with the voltage of the battery and means for conducting the pulses to the heating means when the voltage thereof exceeds the voltage of the battery thereby to power the heating means, the output of the heating means being proportional to the power supplied thereto.

2. Apparatus according to claim 1, in which two consecutive screens are inserted between the fuel atomizing means and the intake.

3. Apparatus according to claim 1, in which the fuel atomizing means is a carburetor and the intake is an intake manifold.

4. Apparatus according to claim 2, in which the fuel atomizing means is a carburetor and the intake is an intake manifold.

* * * * *